United States Patent [19]

Noble

[11] Patent Number: 4,783,593
[45] Date of Patent: Nov. 8, 1988

[54] OPTICAL SYSTEM FOR WIDE ANGLE IR IMAGER

[75] Inventor: Milton L. Noble, Liverpool, N.Y.

[73] Assignee: General Electric Company, Syracuse, N.Y.

[21] Appl. No.: 813,385

[22] Filed: Dec. 26, 1985

[51] Int. Cl.$^4$ .................................................. G01J 1/42
[52] U.S. Cl. ...................................... 250/352; 250/332
[58] Field of Search .................. 250/352, 353, 370 L, 250/332; 350/415

[56] References Cited

U.S. PATENT DOCUMENTS

| | | | |
|---|---|---|---|
| 3,794,838 | 2/1974 | Weiss et al. | 250/352 |
| 4,041,314 | 8/1977 | Oppelt | 250/352 |
| 4,431,917 | 2/1984 | Gibbons | 250/352 |
| 4,505,554 | 3/1985 | De Aubry | 350/415 |

FOREIGN PATENT DOCUMENTS

476246  8/1951  Canada ................................ 250/352

Primary Examiner—Janice A. Howell
Assistant Examiner—Richard Hanig
Attorney, Agent, or Firm—Richard V. Lang; Carl W. Baker; Fred Jacob

[57] ABSTRACT

The invention relates to a high performance optical system for a wide angle IR imager requiring a cryogenic environment for the IR detector array. The wide angle requirement makes it necessary for one lens to be behind a "cold aperture" within the cryogenic environment where focusing is difficult and performance of the aperture reduced. These objectives are minimized by use of a telecentric lens pair, one member of which is within the cryogenic environment. The telecentric lens pair refocuses the primary image formed by an objective lens, permitting a high quality image to be formed on the IR detector array. The usual errors in positioning the internal lens, which might impair the quality of the focused image, are avoided by a compensatory repositioning of the externally accessible objective lens. The use of collimated bundles of light, characteristic of telecentric lens pairs, permits maximum aperture efficiency, and also provides a fourier transformation plane in which spatial filtering may be used to reduce IR background of low spatial frequency.

6 Claims, 6 Drawing Sheets

DEWAR TRANSFER LENS ARRANGEMENT

FIG. 1A

FIG. 2 "FOCAL PLANE"

FIG. 1B FOCAL LENGTH TO ACHIEVE SELECTED IFOV PERFORMANCE $$TAN\ \theta = \frac{(1.7 \times 10^{-3}\ IN.)\ (25.4\ mm/IN.)}{F\ell\ (mm)}$$

$$F\ell = \frac{0.043180}{TAN\ \theta}$$

| IFOV(mr) | FOCAL LENGTH Fℓ (mm) | (DEGREES) ARRAY (SFOV) SIDE 128 (IFOV) | (DEGREES) ARRAY (TFOV) DIAGONAL √2 (128) (IFOV) |
|---|---|---|---|
| 1.0 | 43.18 | 7.33 | 10.37 |
| 3.3 | 13.08 | 24.20 | 23.22 |
| 5.0 | 8.64 | 36.67 | 51.86 |

LEGEND:

FOV = (SENSOR OPTICAL) FIELD OF VIEW =
        [IFOV(R)] = 128 (360/2π)
   IFOV = INSTANTANEOUS FIELD OF VIEW
   SFOV = (ARRAY) SIDE FIELD OF VIEW
   TFOV = (ARRAY DIAGONAL) TOTAL FIELD OF VIEW

NOTE: ALL IN DEGREES

FIG. 3 DEWAR TRANSFER LENS ARRANGEMENT

FIG. 7 OPTICAL SPATIAL FILTERING IN THE TRANSFER LENS

OPTICAL SYSTEM FOR WIDE ANGLE IR IMAGER

BACKGROUND OF THE INVENTION

1. Field of The Invention

The invention relates to IR imaging systems and in particular to a wide angle IR imaging system in which at least a portion of the optical system must be maintained in a cryogenic environment.

2. Prior Art

Wide angle optical systems impose difficult conditions for infrared imaging systems. A combination of a short focal length lens requirement and the need for effective cold shielding force at least one lens element to be fully within the cryogenic environment, where it is difficult to adjust the focus. In addition, assuming that one short focal length lens element is within the cryogenic environment, the design of an optimum aperture for admitting the focused IR image field to the maximum and screening out the unfocused IR background to the maximum becomes important. Typically with single short focus element lenses the loss in lighting efficiency at the margins of the aperture can be as high as 35%. In addition, the sizes of apertures displaced from the center of the lens group are always greater than the apertures of the lenses themselves, further reducing the cold aperture efficiency.

SUMMARY OF THE INVENTION

1. Object of the Invention

Accordingly, it is an object of the invention to provide an improved high performance optical system for a wide angle IR imager.

It is another object of the present invention to provide an improved high performance wide angle optical system for an IR imager requiring a cryogenic environment for the IR detector array and the presence of a lens within the cryogenic environment.

It is still another object of the invention to provide in a high performance wide angle IR imager having one lens within the cryogenic environment, improved means for external focusing.

It is an additional object of the invention to provide in a high performance wide angle IR imager having one lens within the cryogenic environment, improved "cold" aperture efficiency.

It is a further object of the invention to provide in a high performance wide angle IR imager having one lens within the cryogenic environment, improved spatial filtering means for admitting IR image radiation of relatively high spatial frequency and discriminating against IR background of low spatial frequency.

These and other objects of the invention are achieved in an IR sensor head containing an IR detector array installed within a cryogenic enclosure, the sensor head having a wide field of view, high optical performance and high cold shielding efficiency. The inventive combination comprises a first objective lens for imaging the object field in a primary image plane and a telecentric lens pair having one lens installed within the cryogenic enclosure for imaging the primary image upon the IR detector array.

The cryogenic enclosure is evacuated and contains a cold shield and cooling means. A "cold aperture" is provided in the cold shield for admission of IR image radiation and for stopping unfocused IR background illumination.

The first lens of the telecentric lens arrangement is installed outside of the cryogenic enclosure for collimating the ray bundles of the primary image points. The second lens of the telecentric lens arrangement is installed within the enclosure, and focuses the collimated ray bundles into a secondary image plane coincident with the IR detector array.

The "cold aperture", which is spaced between the second and third lenses, in intercepting collimated ray bundles, may be of minimum size for maximum aperture efficiency.

The arrangement permits correction of inaccuracy in the positioning of the third lens in relation to the IR detector array by allowing a compensatory repositioning of the external objective lens in relation to the telecentric lens. For the usual errors, the repositioning is without significant loss in optical performance.

In accordance with more specific aspects of the invention, an image defining aperture is installed in the primary image plane. In addition, the lenses of the telecentric arrangement are spaced at a distance equal to the sum of their focal lengths with the cold shield aperture being spaced at the common focal plane. Preferably the focal lengths of the second and third lens are equal for unity magnification and maximum image quality.

Finally, a spatial filter may be provided consisting of a circular stop disposed on the optical axis substantially in the fourier transformation plane present between the second and third lens for admitting IR image radiation of relatively high spatial frequency and discriminating against IR background of low spatial frequency.

BRIEF DESCRIPTION OF THE DRAWINGS

The invention and distinctive features of the invention are set forth in the claims of the present application. The invention itself, however, together with further objects and advantages thereof, may best be understood by reference to the following description and accompanying drawings in which:

FIGS. 1A and 1B deal with an IR sensor head and certain performance requirements of the sensor head:

DESCRIPTION OF THE PREFERRED EMBODIMENT

Figure 1A:
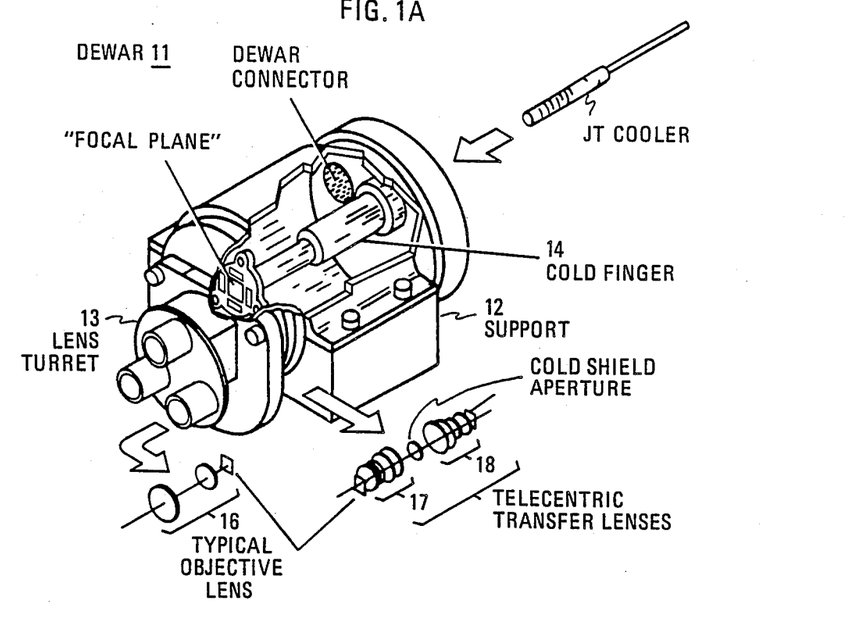
FIG. 1A being a cut-away perspective view of the infrared (IR) sensor head using the novel, high performance wide angle IR optics, which accommodates a variable field of view.
Figure 1B:
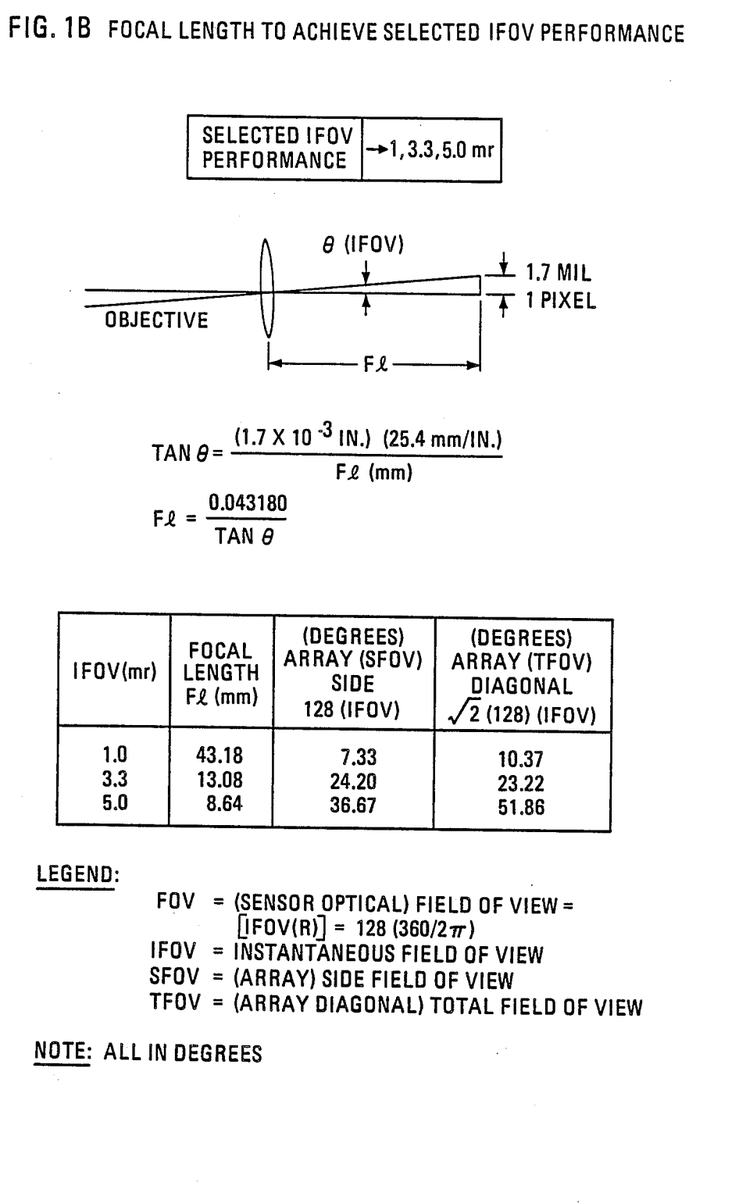
FIG. 1B being a graphical and tabular portrayal of the focal length requirements of the object lenses to achieve the tabulated instantaneous field of view (IFOV) performance.

The high performance, wide angle IR optics embodying the invention are designed for use in the IR sensor head illustrated in FIG. 1A, the sensor head exhibiting the wide field of view, characterized in FIG. 1B.

As earlier noted, the sensor head is that portion of an IR imaging system in which means are provided for imaging an object field and converting the image to an electrical signal. The sensor head contains means for obtaining an optical image of the object field, means for converting the optical image obtained pixel (image or sensor element) by pixel (image or sensor element) to plural electrical signals, and means for converting the plural electrical signals to a sequential electrical signal in a single output path.

The conversion of the area image to a plurality of individual electrical signals is performed by a "detector array". The term "array" denotes the presence of a plurality of individual, optical input-electrical output detector elements. The detector array is itself part of an assembly of integrated circuits which convert the plural simultaneous electrical signals into sequential electrical signals. This assembly, because of its placement in the focal plane of the imaging lens, is often called a "focal plane" or "focal plane assembly". The focal plane assembly, and in particular the detector array within the assembly, must operate at low cryogenic temperatures, typically 77 degrees Kelvin, for IR sensitivity. Accordingly, the sensor head for IR applications contains an evacuatable enclosure suitable for cryogenic operation termed a "dewar", which can be glass or metal, and a cold shield which is usually of copper or aluminum installed within the evacuated chamber. The IR array (and other elements requiring cooling) are installed within the cold shield for radiation shielding from the relatively warm interior of the dewar with an aperture being provided for admission of the IR radiation within the field of view. A cold finger is provided by means of which cooling is introduced into the evacuated enclosure for cooling, the cold shield and the other elements mentioned above being installed within the cold shield.

Figure 3:
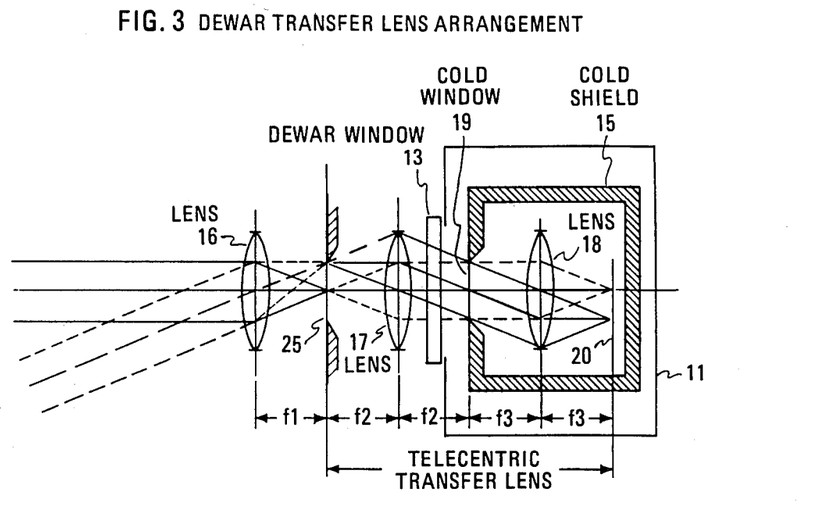
FIG. 3 is an optical schematic of the high performance wide angle IR optics using the novel telecentric transfer lens arrangement for coupling light into the low temperature environment required for operation of the IR sensor array.

The cryogenic construction of the specific IR sensor head in which the invention finds application is illustrated in the cut-away perspective drawing of FIG. 1A with a more schematic view of the cryogenic system being provided in FIG. 3.

As seen in FIG. 1A, the dewar 11 is the outer most enclosure, itself bolted to a suitable chassis or supporting structure 12, and in turn providing the mechanical support for an objective lens turret 13. The dewar 11 is additionally provided with suitable connections for evacuation (not illustrated) for external electrical connection (not illustrated) and the cold finger 14 for active cooling of the interior of the dewar. As shown in FIG. 3, the "cold shield" 15, is provided within the dewar. The IR sensor array 20 which is depicted in both FIGS. 1A and 3, is installed within the cold shield.

The disposition of the optical elements of the IR sensor head in relation to the cryogenic environment is depicted schematically in FIG. 3, and in the exploded perspective view of FIG. 1A.

The optical elements, in accordance with the invention, consist of an objective lens 16 (installed within the turret 13 of FIG. 1A) and a pair of telecentric transfer lenses 17 and 18. The lenses 16, 17, and 18 are illustrated in greater detail in FIG. 1A where the individual elements of the lenses are shown. As shown in FIG. 3, the dewar 11 and the cold shield 15 within it are provided with the openings required for admission of IR into the interior of the cold shield. The opening in the dewar is a vacuum window 13, while the opening in the cold shield forms the critical IR background limiting aperture 19, best illustrated in FIG. 6. The cold shield 15 contains the second lens 18, and the IR sensor array 20. The first lens 17, which is the first element of the telecentric transfer lens pair, is installed outside the vacuum window 13 as is the objective lens 16. (FIG. 6 provides a more detailed illustration of the construction of the cold finger and of the cold shield.)

The optical performance of the sensor head in respect to field of view is illustrated in FIG. 1B. In a practical embodiment, the IR sensor array 20 consists of 128×128 pixel-elements. The array which is installed on the cold finger 14 for good thermal contact and good cooling, consists of a five chip combination in which the central element 20 is the array itself, while the four chips (21–24) surrounding the array perform the functions necessary to deriving serial electrical signals from the array. These elements are not a part of the invention and will not be further discussed.

Figure 2:
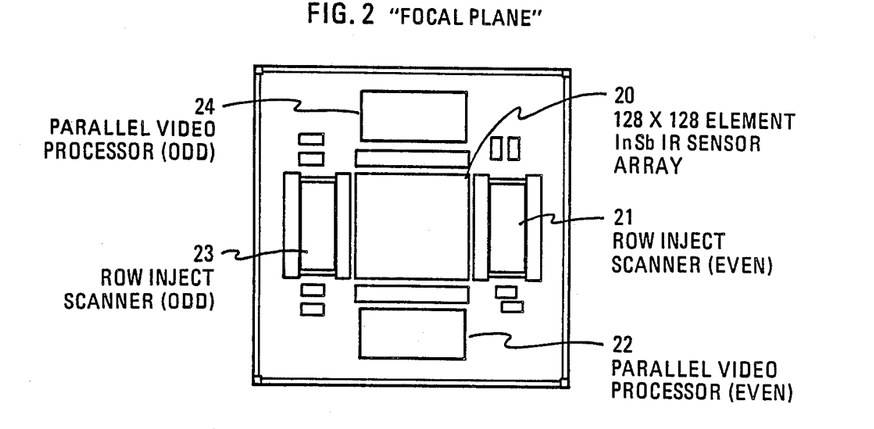
FIG. 2 is a simplified plan view of an infrared detector array and readout electronics chips for use in the IR sensor head shown in FIG. 1.

The array itself, assuming the dimensions of the 128×128 array, illustrated in FIG. 2, require 1.7 mils (0.0017 inches) per sensor element (pixel). FIG. 1B illustrates the focal length requirements of the optical elements required to achieve the instantaneous field of view performance provided in the table. The instantaneous field of view in the example (IFOV) of a pixel is optionally 1, 3.3, or 5 milliradians, when used with objective lenses whose focal lengths are respectively 43.18 millimeters, 13.08 millimeters, and 8.64 millimeters. The field of view of the array measured diagonally (TFOV) for the three cases are respectively 10.37, 23.22, and 51.86 degrees. While these fields of view are exemplary, with modification, the system may accommodate wider fields of view, e.g. 100 degrees (TFOV) with some loss in resolution at maximum apertures as high as F/2.0. The present invention is accordingly addressed to achieving high optical performance in wide field of view optics.

Figure 6:
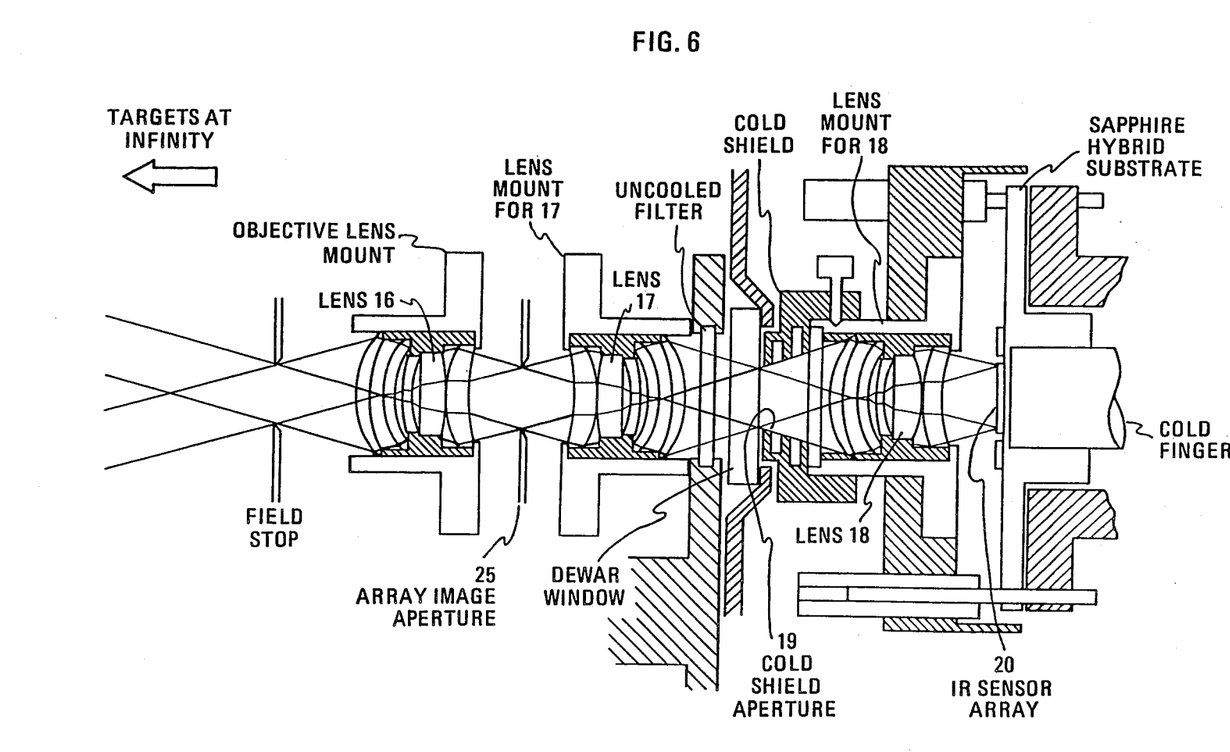
FIG. 6 is a mechanical implementation of the wide angle infrared optics, using the prior lens designs and the IR detector array of FIG. 2.

The optical principles of the optical system are best described in relation to FIG. 3, taking into consideration the assymetry of the individual lenses observable in FIG. 6. The objective lens, having a focal length f1, which is installed on the optical axis of the sensor head images the object field into a primary image plane. An image defining aperture 25 is established in the primary image plane. The lens 17, the second lens of the system and the first member of the telecentric lens pair, has a focal length f2. It is installed outside the dewar 11 at a focal length distance from the image plane. It performs the function of collimating the ray bundles originating from the image plane. The lens 18, the third lens of the system and the second element of the telecentric lens pair, has a focal length f3. It is installed within the cold shield of the dewar at a distance from the second lens 17 equal to the sum of the focal lengths (f2+f3) of the two lenses. The lens 18 is spaced at a focal length distance, f3, from the IR sensor array 20. The lens 18 is arranged to take collimated bundles of light from the lens 17 and focus them upm the secondary image plane coincident with the surface of the IR sensor array. The IR limiting aperture 19 in the cold shield is disposed in the focal planes of the lenses 17 and 18 for maximum aperture efficiency. As shown in FIG. 6, lens elements 17 and 18 of the telecentric pair are identical and are arranged back-to-back, for maximum correction. The objective lens 16, which is a similar design to the other two lenses in the FIG. 6 example, is arranged back-to-back with the lens 17.

Figure 4:
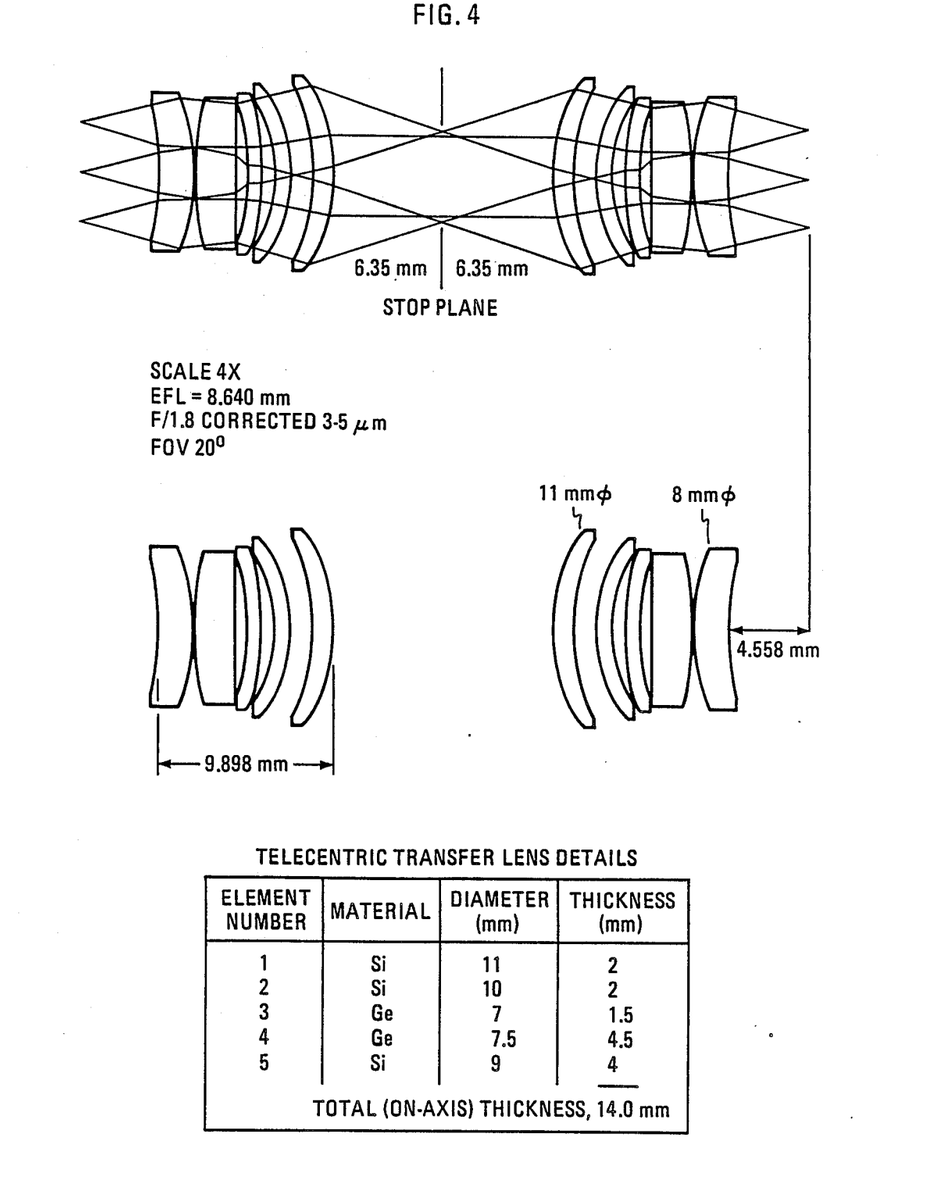
FIG. 4 illustrates an example of the transfer lens design with ray traces and mechanical details.
Figure 5A:
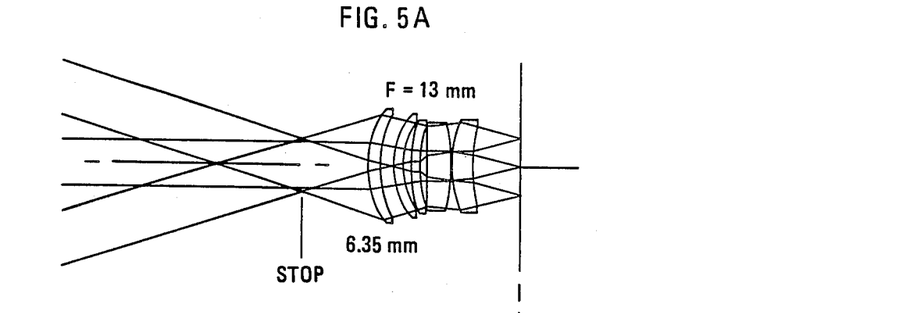
FIGS. 5a-5c are examples of the optical designs of the variable field of view, wide angle IR optical system, ith indicated ray traces for both the objective and transfer lenses.
Figure 5B:
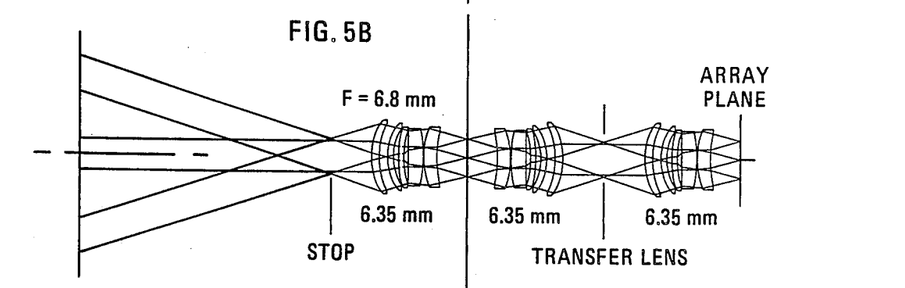
Figure 5C:
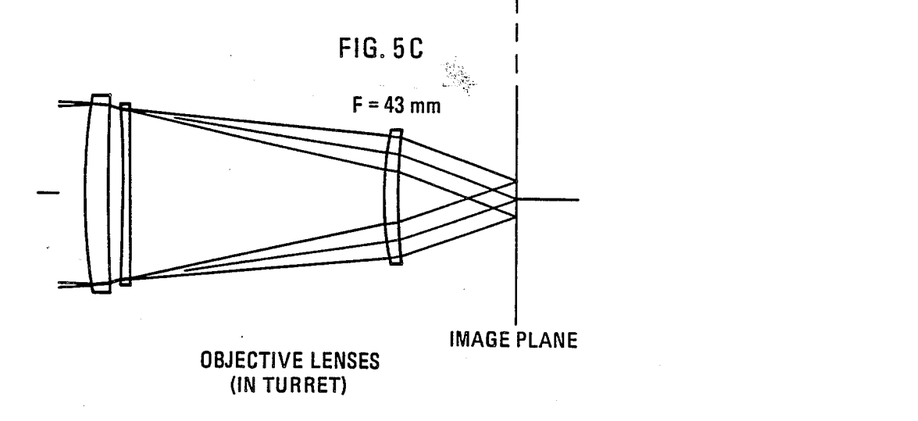

In the example presented in the table of FIG. 1B, the computer generated ray traces for actual lens designs are shown in FIGS. 4 and 5 with the focal lengths and material for the telecentric lens pair being provided in FIG. 4.

In the exemplary telecentric relay lens pair design, five element optics were selected using silicon and germanium, and the lens is designed for use in the three to five micron IR region. The longest focal length objective (43 mm) may only need be a three element lens to achieve the desired performance. The resolution of the exemplary telecentric pair is greater than 50% modulation at 12 cycles/mm. The field of view of the first collimating lens 17 is greater than 50 degrees at an aperture (f) of approximately 1.5. The second collimating lens (18) is identical to lens 17.

The desired characteristics of the three objectives depicted in FIG. 5 are as follows. The 8.6 mm objective lens 16 has, a field of view of 51.8 degrees with a resolution greater than 50% modulation at 20 cycles per mm. The 13 mm objective lens has a 23.2 degree field of view, with a resolution of approximately 50% modulation at 20 cycles per mm. The 43 mm objective has a 10.4 degree field of view with a resolution of approximately 50% modulation at 20 cycles per mm.

The actual construction of the IR sensor head, the positioning of the lenses 16, 17, 18 within it, and the details of the dewar, cold shield 15, and cold finger 14, are illustrated in the cross section view of FIG. 6.

The arrangement so far described is of high convenience as well as high performance. The 1 to 1 magnification telecentric relay lens arrangement with one lens within the cryogenic environment, and the other outside of the cryogenic environment, permits one to achieve a very sharp focus for the very-short focal length wide-angle optics required for this system.

The facility for achieving a sharp focus by an external adjustment may be explained by a consideration of the properties of telecentric lens pairs. The lenses are of identical design in the preferred case, making the system "holocentric" with a one to one transfer ratio. As suggested, the principal geometric distortion introduced by passage of the light through the first element (17) is compensated by passing the same light through the identical second lens (18), with the second lens having a reverse orientation with respect to the first. Between the two lenses, the light is collimated and the exact spacing of the lenses need not be critical except for aperture or spatial filtering considerations. Assuming that the spacing is optimized for aperture efficiency, the two lenses should be spaced apart by a preferred distance equal to the sum of their focal lengths.

The facility for externally adjusting the focus of the image without requiring lens motion within the cryogenic environment may be explained as follows. As should be noted, an accuracy of approximately 1/1000 of an inch in the placement of the lens 18 with respect to the IR sensor array is required to provide the desired resolution. In the practical case, the array is readily defocused by larger amounts by the internal expansions which takes place between conditions at ambient temperature (300 K) when the system is first adjusted and at cryogenic temperatures (77 K) when adjustment is impractical. While practice may improve the accuracy of the final setting, if the setting is approximate, typically within a tolerance of 20 or 30 mils, then the measures just described will provide for operation a fully corrected image within the design limits.

The basis for ease in external adjustment assumes that the externally available objective lens 16 may be translated in the lens mount to move the actual primary image plane in and out from the theoretical focal plane position to accommodate error in the positioning of the inner telecentric element 18. Assuming that the internal dimensions have shifted so that the lens element 18 is too close to the IR sensor array, the objective lens may be moved to bring the image to a focus outside the primary image plane at 25 and further away from the telecentric pair. If on the other hand, the lens element is too far away from the IR sensor array, the objective lens may be adjusted to focus the image in a plane inside the primary image plane and closer to the telecentric pair.

The telecentric lens system continues to maintain a high degree of lens correction (over a 50% IR relative bandwidth) when the error in placement of the inner element falls within the 20-30 mil limits previously noted. In practice, an adjustment to within 10 mils is easily achieved, and the dynamic element of motion as the temperature cycles rarely exceeds 5 mils. Thus, the provision of the telecentric optics satisfies the need for precise focusing without significant image degradation, and without the need for adjusting an element within the cryogenic enclosure.

The use of the telecentric arrangement also provides means for entrance of the beam via the cold aperture into the cryogenic environment which provides efficient cold shielding. The cold shielding efficiency of this common, which may be defined as the ratio of the focused signal illumination admitted divided by the unfocused background illumination admitted, approaches the ideal.

With short focal length lenses, required for wide angle operation, the image illumination uniformity in a non-telecentric arrangement is substantially reduced from the ideal. For example, in a configuration involving a wide angle lens of 8.6 mm, used with a 128×128 element CID array, where the total field of view is 52 degrees, the fall off in illumination is a $COS^4$ theta function equal to 0.65 at the corners of the image. Thus, there is a light loss of 35% at the corners of the image in a non collimated configuration.

There is a second aperture inefficiency, increased for short focal length lenses which the present telecentric arrangement avoids. With conventional lenses any cold aperture outside the lens should be oversized to capture the full ray bundles passing through the lens. Assuming converging ray bundles, the aperture which is displaced from the lens, must be larger than the actual aperture of the lens. In the telecentric transfer lens all image-point light-bundles have the same aperture diameter at the mid-point between the two lenses 17 and 18. Additionally this aperture can be made smaller than the lens diameter. Thus, with an optimized distribution of light from the focused image within the aperture, and with a minimum size aperture required to pass the focused light, the aperturing efficiency of the cold aperture, set between the telecentric elements, becomes the ideal.

Figure 7:
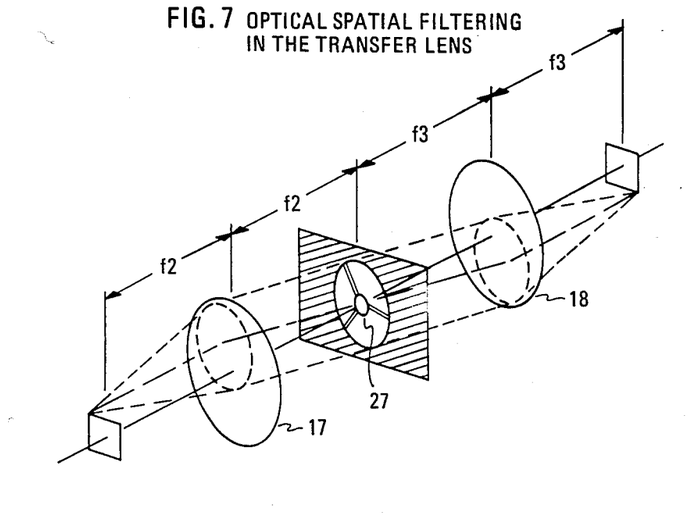
FIG. 7 is an optical schematic of an optical spatial filter for positioning in the cold shield aperture for achieving spatial frequency discrimination against low spatial frequency IR background within the field of view of the optical system.

A third advantage of the telecentric arrangement arises if it is desired to provide fourier plane filtering. One might explain that with an approximation of the ideal positioning so far described, a fourier transformation of the primary image appears in the plane of the cold aperture. The physical aperture is at the entrance to the cold aperture and may be supported by the cold shield. The light passing from the objective lens image is decomposed in this plane into the fourier components. Spatial frequency terms are distributed linearly with radius from the optic axis. DC spatial frequency or low frequency terms appear on or near the optic axis and higher spatial frequency terms appear at increasing radii from the axis. FIG. 7 shows an optical spatial filtering arrangement suitable for use with the present transfer lens. With the cold shield aperture designed to minimize unfocused background IR illumination falling on the IR detector, additional optimization may also occur depending on the nature of the desired IR signal. As shown in FIG. 7, a spatial filter, which may be useful in filtering out low frequency terms may take the form of a small circular stop 27. The stop 27 is centered on the optic axis and has a suitable radius to limit the unfocused background of low spatial frequency objects from reaching the detector. The effectiveness of the optical spatial filter is a function of both the nature of the IR background and the desired IR image information. With uniform IR background and with the sought for IR image peaked at higher spatial frequencies, a stop can substantially improve the signal to background ratio. For example, assuming that most of the signals appear as one or two pixels on the IR sensor array, a significant quantity of low spatial frequency light may be removed without significantly reducing the signal from the point target images. The filter thus may be used to increase the signal to noise ratio in reception of IR images under these conditions.

What is claimed is:

1. In an IR sensor head containing an IR detector array installed within a cryogenic enclosure, said sensor head exhibiting a wide field of view, high optical performance and high cold shielding efficiency, the combination comprising:
   (A) a first objective lens having a focal length (f1) installed on said optical axis for imaging the object field into a primary image plane,
   (B) an evacuated cryogenic, cold shielding enclosure, including
      (1) an aperture in the cold shield installed on said optical axis for admission of IR image radiation and for stopping unfocused IR background illumination, and
      (2) cooling means
   (C) an IR detector array installed in said enclosure on said optical axis and cooled by said cooling means, and
   (D) a telecentric lens arrangement comprising
      (1) a second lens having a focal length (f2) installed outside said enclosure on said optical axis at a distance from said primary image plane for collimating the ray bundles of said primary image points,
      (2) a third lens having a focal length (f3) installed within said enclosure on said optical axis at a distance from said IR detector array for focusing said collimated ray bundles of said image points into a secondary image plane on said IR detector array,
   said cold shield aperture being spaced between said second and third lenses, and of minimum size for intercepting said collimated ray bundles for maximum aperture efficiency,
   said arrangement permitting correction of inaccuracy in the positioning of said third lens in relation to said IR detector array by a compensatory repositioning of said objective lens in relation to said telecentric lens arrangement without a significant loss in optical performance.

2. The combination set forth in claim 1, having in addition thereto
   an image defining aperture installed on said optical axis in said primary image plane.

3. The combination set forth in claim 2 wherein
   said third lens is spaced from said second lens at a distance substantially equal to the sum of the focal lengths of said second and third lenses (f2+f3), and
   said cold shield aperture is spaced at a distance substantially equal to f2 from said second lens and at a distance substantially equal to f3 from said third lens for maximum aperture efficiency.

4. The combination set forth in claim 3 wherein
   the focal lengths of said second and third lens, the members of said telecentric lens arrangement, are equal for unity magnification and maximum image quality.

5. The combination set forth in claim 4 having in addition thereto:
   a spatial filter consisting of a circular stop disposed on said optical axis substantially in the fourier transformation plane between said second and third lenses for admitting IR image radiation of relatively high spatial frequency and discriminating against IR background of low spatial frequency.

6. The arrangement set forth in claim 4 wherein said second and third lens are identical, with the third lens having a reverse orientation to the second lens in respect to light passing through to form a highly corrected holocentric arrangement.

* * * * *